United States Patent

Caldara et al.

[11] Patent Number: 5,948,067
[45] Date of Patent: Sep. 7, 1999

[54] CONVERTING BETWEEN AN INTERNAL CELL AND MULTIPLE STANDARD ASYNCHRONOUS TRANSFER MODE CELLS

[75] Inventors: Stephen A. Caldara, Sudbury; Stephen A. Hauser, Burlington; Thomas A. Manning, Northboro, all of Mass.

[73] Assignees: Fujitsu Network Communications, Inc., Richardson, Tex.; Fujitsu Limited, Kawasaki, Japan

[21] Appl. No.: 08/685,197

[22] Filed: Jul. 18, 1996

Related U.S. Application Data

[60] Provisional application No. 60/001,498, Jul. 19, 1995.

[51] Int. Cl.[6] .............................. G06F 13/38; G06F 15/17
[52] U.S. Cl. ............................................ 709/236; 370/467
[58] Field of Search ............................. 395/200, 66–68; 370/467, 466, 473, 474

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,084,228 | 4/1978 | Dufond et al. | 364/200 |
| 4,240,143 | 12/1980 | Bessemer et al. | 364/200 |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,748,658 | 5/1988 | Gopal et al. | 379/221 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |

(List continued on next page.)

OTHER PUBLICATIONS

Head Of Line Arbitration in ATM Switches Input–Output Buffering and Backpressure Control. By Hosein F. Badran and H. T. Mouftah, *Globecom* '91, pp. 0347–0351.

An Ascom Timeplex White Paper, *Meeting Critical with Scalable Enterprise Networking Solutions Based on a Unified ATM Foundation*, pp. 1–12, Apr. 1994.–Apr. 1995?

Douglas H. Hunt, *ATM Traffic Management—Another Perspective*, Business Communications Review, Jul. 1994.

Richard Bubenik et al. *Leaf Initiated Join Extensions*, Technical Committee, Signaling Subworking Group, ATM Forum/94–0325R1, Jul. 1, 1994.

Douglas H. Hunt et al., *Flow Controlled Virtual Connections Proposal for ATM Traffic Management* (Revision R2) Traffic Management Subworking Group, ATM–Forum/94–0632R2, Aug. 1994.

Introduction to Networking, http://www.ics.muni.cz/cisco/data/doc/cinternet/ito/55016.htm, 1995.

Asynchronous Transfer Mode, http://www.ics.muni.cz/cisco/data/doc/cinternet/ito/55755.htm, 1995.

SITA: Atm RFP: C–Overall Technical Requirements, Sep. 1994.

*Primary Examiner*—Frank J. Asta
*Assistant Examiner*—Daniel Patru
*Attorney, Agent, or Firm*—Weingarten, Schurgin, Gagnebin & Hayes LLP

[57] ABSTRACT

A switch control module (16) is provided for converting between an internal cell (23) and a first standard asynchronous transfer mode cell (34) and second standard asynchronous transfer mode cell (36). The internal cell (23) includes an internal header (42), payload information (44), and miscellaneous information (46). The first standard asynchronous transfer mode cell (34) includes the internal header (42) and miscellaneous information (46) of the internal cell (23). The second standard asynchronous transfer mode cell (36) includes the payload information (44) of the internal cell (23).

19 Claims, 3 Drawing Sheets

U.S. PATENT DOCUMENTS

| | | | |
|---|---|---|---|
| 4,872,157 | 10/1989 | Hemmady et al. | 370/60 |
| 4,872,159 | 10/1989 | Hemmady et al. | 370/60 |
| 4,872,160 | 10/1989 | Hemmady et al. | 370/60 |
| 4,872,197 | 10/1989 | Pemmaraju | 379/93 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,833 | 1/1990 | Kent et al. | 370/85.2 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,942,574 | 7/1990 | Zelle | 370/85.15 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,014,192 | 5/1991 | Mansfield et al. | 364/200 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,827 | 3/1992 | Franklin et al. | 370/60.1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 395/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,208,811 | 5/1993 | Kashio et al. | 370/401 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,278,972 | 1/1994 | Baker et al. | 395/200.76 |
| 5,280,469 | 1/1994 | Taniguchi et al. | 3370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,352 | 2/1994 | Jackson et al. | 370/466 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,289,472 | 2/1994 | Cho | 370/467 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Urui et al. | 370/60 |
| 5,301,190 | 4/1994 | Tsukuda et al. | 370/66 |
| 5,301,193 | 4/1994 | Toyofuku et al. | 370/94.1 |
| 5,303,232 | 6/1994 | Faul Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakamima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 4/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,341,483 | 8/1994 | Frank et al. | 395/400 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,363,497 | 11/1994 | Baker et al. | 395/425 |
| 5,365,514 | 11/1994 | Hershey et al. | 370/17 |
| 5,369,570 | 11/1994 | Parad | 364/401 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock II | 395/200 |
| 5,394,396 | 2/1995 | Yoshimura et al. | 370/60 |
| 5,394,397 | 2/1995 | Yanagi et al. | 370/60.1 |

| | | | | | | | |
|---|---|---|---|---|---|---|---|
| 5,398,235 | 3/1995 | Tsuzuki et al. | 370/16 | 5,506,956 | 4/1996 | Cohen | 395/182.04 |
| 5,400,337 | 3/1995 | Munter | 370/60.1 | 5,509,001 | 4/1996 | Tachibana et al. | 370/17 |
| 5,402,415 | 3/1995 | Turner | 370/60 | 5,509,007 | 4/1996 | Takashima et al. | 370/60.1 |
| 5,412,648 | 5/1995 | Fan | 370/60 | 5,513,134 | 4/1996 | Cooperman et al. | 365/49 |
| 5,414,703 | 5/1995 | Sakaue et al. | 370/60 | 5,513,178 | 4/1996 | Tanaka | 370/58.2 |
| 5,418,942 | 5/1995 | Krawchuk et al. | 395/600 | 5,513,180 | 4/1996 | Miyake et al. | 370/60.1 |
| 5,420,858 | 5/1995 | Marshall et al. | 370/60.1 | 5,515,359 | 5/1996 | Zheng | 370/13 |
| 5,420,988 | 5/1995 | Elliot | 395/275 | 5,517,495 | 5/1996 | Lund et al. | 370/60 |
| 5,422,879 | 6/1995 | Parsons et al. | 370/60 | 5,519,690 | 5/1996 | Suzuka et al. | 370/17 |
| 5,425,021 | 7/1995 | Derby et al. | 370/542 | 5,521,905 | 5/1996 | Oda et al. | 370/17 |
| 5,425,026 | 7/1995 | Mori | 370/60 | 5,521,915 | 5/1996 | Dieudonne et al. | 370/60.1 |
| 5,426,635 | 6/1995 | Mitra et al. | 370/60 | 5,521,916 | 5/1996 | Choudhury et al. | 370/60.1 |
| 5,432,713 | 7/1995 | Takeo et al. | 364/514 | 5,521,917 | 5/1996 | Watanabe et al. | 370/1 |
| 5,432,784 | 7/1995 | Ozveren | 370/79 | 5,521,923 | 5/1996 | Willmann et al. | 370/94.1 |
| 5,432,785 | 7/1995 | Ahmed et al. | 370/79 | 5,523,999 | 6/1996 | Takano et al. | 370/58.2 |
| 5,432,908 | 7/1995 | Heddes et al. | 395/250 | 5,524,113 | 6/1996 | Gaddis | 370/60.1 |
| 5,436,886 | 7/1995 | McGill | 370/16 | 5,526,344 | 6/1996 | Diaz et al. | 370/16 |
| 5,436,893 | 7/1995 | Barnett | 370/60.1 | 5,528,588 | 6/1996 | Bennett et al. | 370/60 |
| 5,440,547 | 8/1995 | Easki et al. | 370/60 | 5,528,590 | 6/1996 | Iidaka et al. | 370/60.1 |
| 5,444,702 | 8/1995 | Burnett et al. | 370/60.1 | 5,528,591 | 6/1996 | Lauer | 370/79 |
| 5,446,733 | 8/1995 | Tsuruoka | 370/60.1 | 5,530,695 | 6/1996 | Digne et al. | 370/17 |
| 5,446,737 | 8/1995 | Cidon et al. | 370/85.5 | 5,533,009 | 7/1996 | Chen | 370/17 |
| 5,446,738 | 8/1995 | Kim et al. | 370/94.2 | 5,533,020 | 7/1996 | Byrn et al. | 370/60.1 |
| 5,448,559 | 9/1995 | Hayter et al. | 370/60.1 | 5,535,196 | 7/1996 | Aihara et al. | 370/60 |
| 5,448,621 | 9/1995 | Knudsen | 379/58 | 5,535,197 | 7/1996 | Cotton | 370/60 |
| 5,450,406 | 9/1995 | Esaki et al. | 370/60.1 | 5,537,394 | 7/1996 | Abe et al. | 370/17 |
| 5,452,296 | 9/1995 | Shimizu | 370/60.1 | 5,541,912 | 7/1996 | Choudhury et al. | 370/17 |
| 5,454,299 | 9/1995 | Thessin et al. | 370/62 | 5,544,168 | 8/1996 | Jeffery et al. | 370/60.1 |
| 5,455,820 | 10/1995 | Yamada | 370/17 | 5,544,169 | 8/1996 | Norizuki et al. | 370/60.1 |
| 5,455,825 | 10/1995 | Lauer et al. | 370/60 | 5,544,170 | 8/1996 | Kasahara | 370/84 |
| 5,457,687 | 10/1995 | Newman | 370/85.3 | 5,546,389 | 8/1996 | Wippenbeck et al. | 370/60 |
| 5,459,743 | 10/1995 | Fukuda et al. | 371/67.1 | 5,546,391 | 8/1996 | Hochschild et al. | 370/60 |
| 5,461,611 | 10/1995 | Drake Jr. et al. | 370/54 | 5,546,392 | 8/1996 | Boal et al. | 370/60.1 |
| 5,463,620 | 10/1995 | Sriram | 370/60 | 5,550,821 | 8/1996 | Akiyoshi | 370/60.1 |
| 5,463,628 | 10/1995 | Sorensen | 370/467 | 5,550,823 | 8/1996 | Irie et al. | 370/60.1 |
| 5,463,629 | 10/1995 | Ko | 370/110.1 | 5,553,057 | 9/1996 | Nakayama | 370/13 |
| 5,463,775 | 10/1995 | DeWitt et al. | 395/184.01 | 5,553,068 | 9/1996 | Aso et al. | 370/60 |
| 5,465,331 | 11/1995 | Yang et al. | 395/200 | 5,555,243 | 9/1996 | Kakuma et al. | 370/58.2 |
| 5,465,365 | 11/1995 | Winterbottom | 395/600 | 5,555,265 | 9/1996 | Kakuma et al. | 370/60 |
| 5,467,342 | 11/1995 | Logston et al. | 370/17 | 5,557,607 | 9/1996 | Holden | 370/58.2 |
| 5,467,350 | 11/1995 | Price et al. | 370/467 | 5,568,479 | 10/1996 | Watanabe et al. | 370/60.1 |
| 5,469,003 | 11/1995 | Kean | 326/39 | 5,570,361 | 10/1996 | Norizuki et al. | 370/60.1 |
| 5,473,608 | 12/1995 | Gagne et al. | 370/85.13 | 5,570,362 | 10/1996 | Nishimura | 370/60.1 |
| 5,475,679 | 12/1995 | Munter | 370/58.2 | 5,572,522 | 11/1996 | Calamvokis et al. | 370/60.1 |
| 5,479,401 | 12/1995 | Bitz et al. | 370/60.1 | 5,577,032 | 11/1996 | Sone et al. | 370/58.3 |
| 5,479,402 | 12/1995 | Hata et al. | 370/60.1 | 5,577,035 | 11/1996 | Hayter et al. | 370/60 |
| 5,483,526 | 1/1996 | Ben-Nun et al. | 370/60.1 | 5,583,857 | 12/1996 | Souiyama et al. | 370/233 |
| 5,485,453 | 1/1996 | Wahlman et al. | 370/16 | 5,583,858 | 12/1996 | Hanoaka | 370/392 |
| 5,485,455 | 1/1996 | Dobbins et al. | 370/60 | 5,583,861 | 12/1996 | Holden | 370/395 |
| 5,487,063 | 1/1996 | Kakuma et al. | 370/56 | 5,590,132 | 12/1996 | Ishibashi et al. | 370/236 |
| 5,488,606 | 1/1996 | Kakuma et al. | 370/16 | 5,602,829 | 2/1997 | Nie et al. | 370/235 |
| 5,491,691 | 2/1996 | Shtayer et al. | 370/61 | 5,606,552 | 2/1997 | Baldwin et al. | 370/474 |
| 5,491,694 | 2/1996 | Oliver et al. | 370/85.4 | 5,610,913 | 3/1997 | Tomonagawa et al. | 370/219 |
| 5,493,566 | 2/1996 | Ljunberg et al. | 370/60 | 5,623,405 | 4/1997 | Isono | 395/230 |
| 5,497,369 | 3/1996 | Wainright | 370/60 | 5,625,846 | 4/1997 | Kobayakawa et al. | 395/872 |
| 5,499,238 | 3/1996 | Shon | 370/60.2 | 5,633,861 | 5/1997 | Hanson et al. | 370/232 |
| 5,504,741 | 4/1996 | Yamanaka et al. | 370/58.2 | 5,712,853 | 1/1998 | Mathure et al. | 370/467 |
| 5,504,742 | 4/1996 | Kakuma et al. | 370/60.1 | 5,724,348 | 3/1998 | Basso et al. | 370/384 |
| 5,506,834 | 4/1996 | Sekihata et al. | 370/17 | 5,805,568 | 9/1998 | Shinbashi | 370/223 |
| 5,506,839 | 4/1996 | Hatta | 370/60 | | | | |

CONVERTING BETWEEN AN INTERNAL CELL AND MULTIPLE STANDARD ASYNCHRONOUS TRANSFER MODE CELLS

RELATED PATENT APPLICATION

This application is related to U.S. Provisional Patent Application Ser. No. 60/001,498, filed Jul. 19, 1995.

TECHNICAL FIELD OF THE INVENTION

This invention relates generally to the field of communication systems, and more particularly to converting between an internal cell and multiple standard asynchronous transfer mode cells.

BACKGROUND OF THE INVENTION

A communication system includes a collection of components that communicate, manipulate, and process information in a variety of ways. The system may support different access technologies, such as frame relay, circuit services, and new and evolving connection-based or connectionless services, that communicate information, such as data, voice, and video. Switches in the communication system employ hardware and software to route information generated by access technologies to an intended destination.

Different types of information cells may be used by a communication switch to relay information. One type of cell may be an internal cell which is transmitted over connections or links within the switch. Another type of cell, such as a standard asynchronous transfer mode (ATM) cell, can be used to convey information to equipment external to the switch. In some cases, an internal cell may comprise more bytes of information than a standard ATM cell. If information within such an internal cell needs to be used outside of the switch, a single standard ATM cell is not sufficient to transport all of the information contained in the internal cell.

SUMMARY OF THE INVENTION

Accordingly, a need has arise for a system and method for converting between an internal cell and multiple standard asynchronous (ATM) transfer mode cells.

In accordance with one embodiment of the present invention, a switch control module is provided for converting between an internal cell and a first and second standard asynchronous transfer mode cell. The internal cell includes an internal header, payload information, and miscellaneous information. The first standard asynchronous transfer mode cell includes the internal header and miscellaneous information of the internal cell. The second standard asynchronous transfer mode cell includes the payload information of the internal cell.

In accordance with another embodiment of the present invention, a system is provided for converting between an internal cell and multiple standard asynchronous transfer mode cells. The system includes a to-switch port processor which may receive an internal cell having an internal header, payload information, and miscellaneous information. A switch control module is coupled to the to-switch port processor. The switch control module inserts the internal header and miscellaneous information from the internal cell into the payload of a first standard asynchronous transfer mode cell. The switch control module inserts the payload information of the internal cell into the payload of a second standard asynchronous transfer mode cell.

In accordance with yet another embodiment of the present invention, a method is provided for converting between an internal cell and multiple standard asynchronous transfer mode cells. The method includes receiving an internal cell having an internal header, payload information, and miscellaneous information. The internal header and the miscellaneous information are inserted into a first standard asynchronous transfer mode cell. The payload information is inserted into a second standard asynchronous transfer mode cell.

An important technical advantage of the present invention includes converting between a single internal cell and multiple standard asynchronous transfer node cells. According to one aspect of the present invention, an internal header and miscellaneous information are extracted from an internal cell. The internal header and miscellaneous information are inserted into the payload of a first standard ATM cell. Payload information of the internal cell is extracted and inserted into the payload of a second standard ATM cell. As a complement to the technique of converting an internal cell into two standard ATM cells, according to another aspect of the present invention, a first and second standard ATM cell in the two-cell format can be converted to an internal cell by extracting information from the payload of the two ATM cells and constructing the internal cell. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

The preferred embodiment of the present invention and its advantages are best understood by referring to FIGS. 1–4 of the drawings, like numerals being used for like and corresponding parts of the various drawings.

Figure 1:
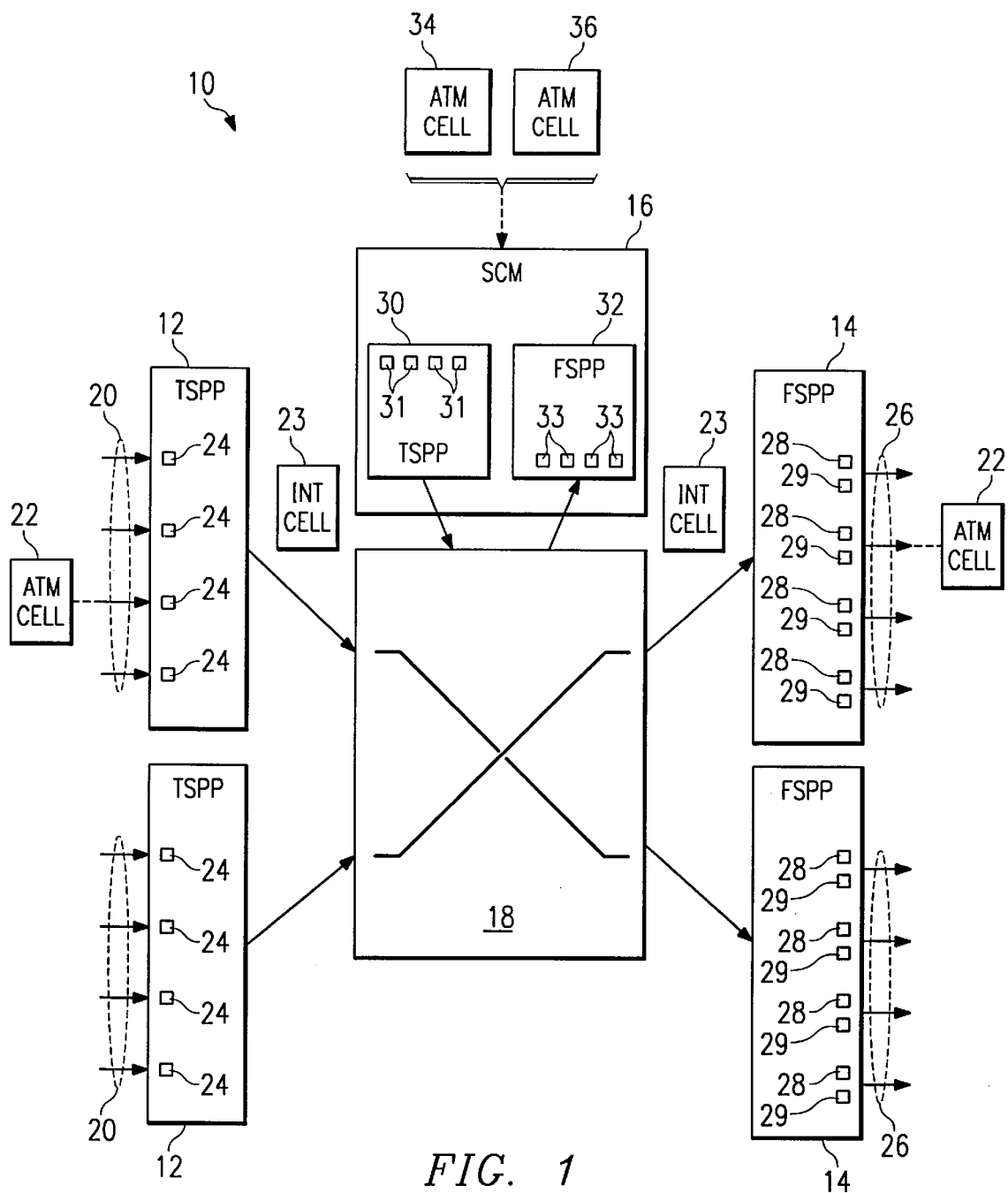
FIG. 1 illustrates a system for converting between a single internal cell and multiple standard ATM cells.

FIG. 1 illustrates a system 10 for converting between a single internal cell and multiple standard ATM cells in a communication switch. System 10 may be operated in a normal mode or a two-cell mode. The normal mode of operation comprises all processing which is typical in a communication switch. The following primarily describes the two-cell mode of operation. System 10 includes at least one to-switch port processor (TSPP) 12, at least one from-switch port processor (FSPP) 14, a switch control module (SCM) 16, and switch fabric 18.

Each TSSP 12 can be implemented as an application specific integrated circuit (ASIC). Each TSPP 12 may include a number of links 20. Each link 20 may support ATM cell relay (OC-12, OC-30, 155 Mbps UTP), frame relay (T1, E1, T3, E3, V0.35), circuit emulation (T1, E1, T3, E3), internetworking using Ethernet, Fast Ethernet, Internet Protocol (IP), or IP over ATM, or any other communications protocol or access technology. In one embodiment, each TSPP 12 supports eight links 20. A TSPP 12 may receive various cells, such as an ATM cell 22, at any of its links 20. ATM cell 22 comprises a "packet" of information that is converted by TSPP 12 into an internal cell 23. In one embodiment, internal cell 23 may comprise fifty-six bytes of information. Each TSPP 12 also includes a plurality of TSPP queues 24 for each link 20. TSPP queues 24 function to hold or contain an internal cell 23 after it has been received by TSPP 12.

Each FSPP 14, which can also be implemented as an ASIC, may include multiple links 26. Links 26 are substantially similar to links 20. In one embodiment, an FSPP 14 supports eight links 26. Each FSPP 14 may be associated with a specific TSPP 12, the associated TSPP 12 and FSPP 14 being included in a single input/output module (IOM) (not shown). An FSPP 14 may include a plurality of FSPP queues 28 and 29 for each link 26 of the FSPP 14. FSPP ques 28 are used for normal cell processing. The control software reserves FSPP queues 29 for each of the links 26. These reserved queues are used to insert operational and maintenance (OAM) cells into the cell stream.

SCM 16 functions to process and route cells of information extracted from and inserted into the connections in system 10, including connections 20 and 26. SCM 16 may operate on both internal cells 22 and other cells, such as standard ATM cells 34 and 36. SCM 16 may receive internal cells 22 from TSPPs 12. SCM 16 functions to convert some of these internal cells 22, such as cells relating to operation and maintenance (OAM), into multiple standard ATM cells in a two-cell format, described below in more detail. These standard ATM cells may be used within SCM 16 internally or transmitted by SCM 16 to equipment external of system 10. Furthermore, SCM 16 may receive standard ATM cells in a two-cell format, such as standard ATM cells 34 and 36, from sources external system 10. SCM 16 may convert these standard ATM cells to a single internal cell which can be inserted into the switch 10 at TSPP 30. SCM 16 comprises a TSPP 30 and FSPP 32. TSPP 30 may store internal cells 22 which are converted from multiple standard ATM cells in two-cell format. TSPP 30 may include a plurality of queues 31. FSPP 32 may receive and store internal cells 22 extracted from TSPP 12 for reformatting into multiple standard ATM cells. FSPP 32 may include a plurality of queues 33.

Switch fabric 18 connects TSPPs 12, FSPPs 14, and SCM 16. Switch fabric 18 functions to relay any information between TSPPs 12, FSPPs 14, and SCM 16. Switch fabric 18 can be implemented as an ECL cross-point device.

Figure 2:
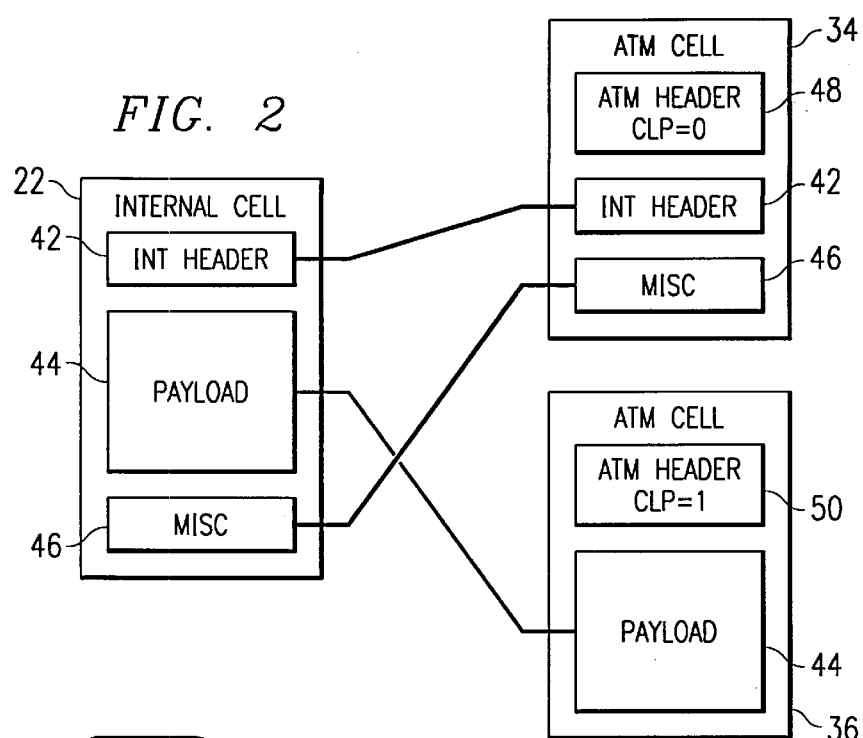
FIG. 2 illustrates a single internal cell and its associated multiple standard ATM cells.

FIG. 2 illustrates internal cell 23 and associated standard ATM cells 34 and 36 which are in two-cell format. In one embodiment, internal cell 23 may comprise sixty bytes of information, whereas standard ATM cells 34 and 36 each comprise fifty-three bytes of information.

Internal cell 23 comprises an internal header 42, payload information 44, and miscellaneous information 46. Internal header 42 may include a virtual channel identification (VCI) field, a virtual path identification (VPI) field, and other information. Payload information 44 may comprise control information for the switch. Miscellaneous information 46 includes information which can be used, for example, to identify the link 20 and TSPP 12 at which internal cell 23 is received.

First standard ATM cell 34 may include an ATM header 48, which comprises a cell loss priority (CLP) bit. In a two-cell format, the CLP bit in ATM header 48 of first ATM cell 34 is set to "0." First ATM cell 34 includes a portion of the information contained in internal cell 23. In particular, the payload of first ATM cell 34 may contain internal header 42 and miscellaneous information 46.

Second ATM cell 36 includes a header 50, which also comprises a CLP bit. In two-cell format, the CLP bit of second ATM cell 36 is set to "1." Second ATM cell 36 also comprises a portion of the information from internal cell 23. Specifically, the payload of second ATM cell 36 includes payload information 44.

Figure 3:
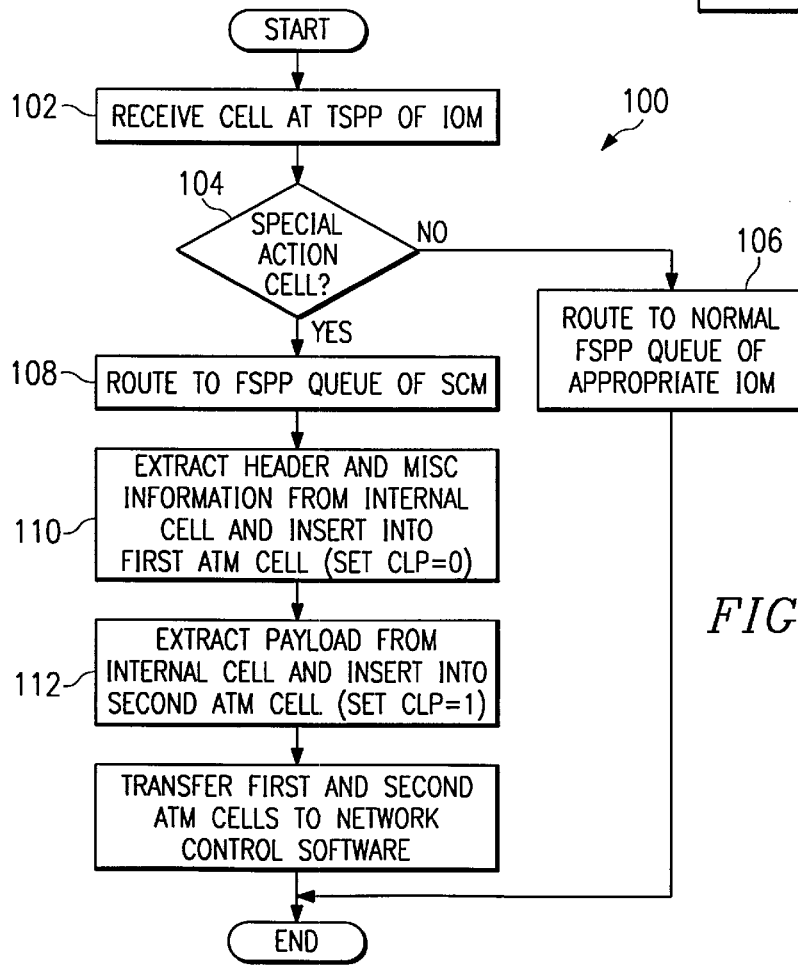
FIG. 3 is a flow chart of a method for converting an internal cell extracted from a link or connection into multiple standard ATM data cells.

FIG. 3 is a flow chart for a method 100 for extracting an internal cell 23 from a connection 20 in a communication switch and converting the cell into multiple standard ATM cells in two-cell format, such as ATM cells 34 and 36. Method 100 begins at step 102 where a TSPP 12 receives internal cell 23.

At step 104, TSPP 12 determines whether the received internal cell 23 is a special action cell, such as an OAM cell. If not, TSPP 12 routes internal cell 23 to the normal queue 28 in FSPP 14 of an appropriate IOM via switch fabric 18 at step 106. Normal FSPP queue 28 translates the data in internal cell 23 so that the cell may be output onto the link 26 corresponding to the normal FSPP queue 28.

If at step 104 TSPP 12 determines that the received internal cell 23 is a special action cell, TSPP 12 routes the internal cell to an appropriate FSPP queue 33 on SCM 16 at step 108. At step 110, FSPP 32 extracts internal header 42 and miscellaneous information 46 from internal cell 23. FSPP 32 then inserts this information into the payload of a first ATM cell 34. FSPP 32 sets the CLP bit in ATM header 48 of first ATM cell 34 to "0." At step 112, FSPP 32 extracts payload information 44 from internal cell 23 and inserts this information into the payload of second ATM cell 36. FSPP 32 sets the CLP bit in header 50 of second ATM cell 36 to "1." In this manner, FSPP 32 generates ATM cells 34 and 36 in two-cell format. At step 114, FSPP 32 then transfers ATM cells 34 and 36 to the network control software for processing. Because cells 34 and 36 are standard ATM cells, these cells can be used in circuitry external to links 20, 26 of the communication switch.

Figure 4:
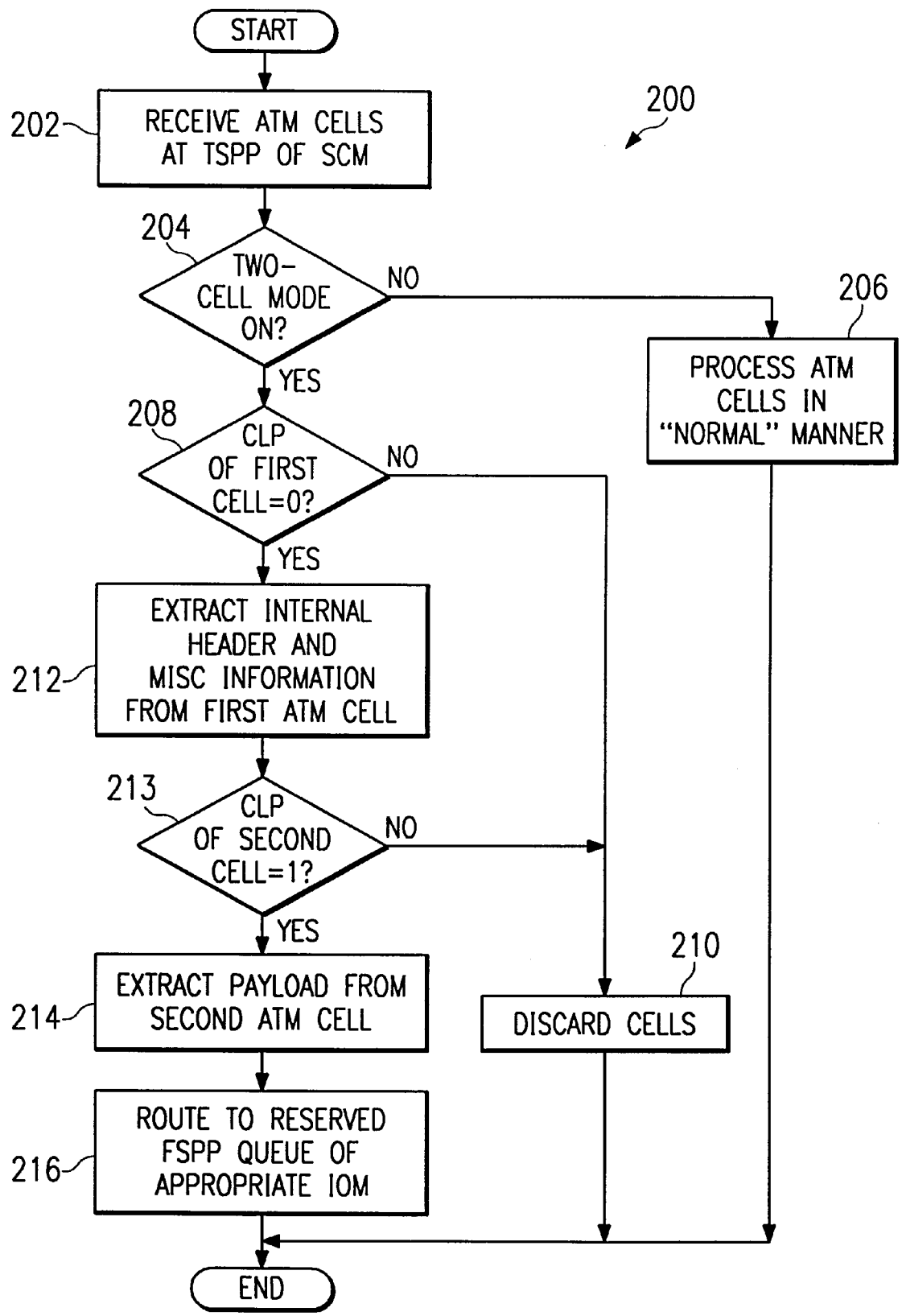
FIG. 4 is a flow chart of a method for converting multiple standard ATM data cells in a two-cell format into a single internal cell for insertion into a connection.

FIG. 4 is a flow chart of a method 200 for converting two standard ATM cells in two-cell format, such as ATM cells 34 and 36, into a single internal cell 23 for insertion into a link 26. Method 200 begins at step 202 where ATM cells 34 and 36 are received at SCM 16. SCM 16 determines whether two-cell mode is in operation at step 204. If not, SCM 16 processes the received ATM cells in a normal mode at step 206.

TSPP 30 performs steps to serve as a check to validate first and second ATM cells 34 and 36. As stated before, for two related ATM cells in a two-cell format, the CLP bit of the first cell should be set to "0" and the CLP bit of the second cell should be set to "1." At step 208, TSPP 30 determines whether the CLP bit of first ATM cell 34 is set to "0". If not, then TSPP 30 discards first ATM 34 at step 210. If the CLP bit is set to zero, TSPP 30 extracts the internal header 42 and miscellaneous information 46 from the payload of first ATM cell 34 at step 212. After extraction, TSPP 30 determines whether the CLP bit of second ATM cell 36 is set to "1". If not, TSPP 30 discards it at step 210. If the CLP bit is set to "1", TSPP 30 then extracts the payload information 44 from the payload of second ATM cell 36 at step 214. The extracted information is used to construct a single internal cell 23 which can be inserted into the switch fabric 18 of system 10.

At step 216, switch fabric 18 routes internal cell 23 to a reserved FSPP queue 29 of an appropriate IOM. FSPP queue 29 then converts internal cell 23 into OAM cell 22 for insertion into a cell flow on link 26 without translation.

Although the present invention and its advantages have been described detail, it should be understood that various changes, substitutions, and alterations can be made therein without departing from the spirit and scope of the invention as defined by the appended claims.

What is claimed is:

1. In an asynchronous transfer mode switch operable to communicate operation and maintenance data via internal cells, a switch control module operable to selectively convert an internal cell to plural standard asynchronous transfer mode cells, the switch control module comprising:

a from-switch port processor operable to detect whether an internal cell is a special action cell requiring two-cell conversion, and if so, to place an internal header, payload information, and miscellaneous information of the internal cell into a first standard asynchronous transfer mode cell and a second standard asynchronous transfer mode cell, wherein the from-switch port processor is operable to insert the internal header and miscellaneous information from the internal cell into a payload of the first standard asynchronous transfer mode cell, and wherein the from-switch port processor is operable to insert the payload information from the internal cell into a payload of the second standard asynchronous transfer mode cell.

2. The switch control module of claim 1, wherein the from-switch port processor is further operable to set the value of a CLP bit in the first standard asynchronous transfer mode cell to "0", the from-switch port processor further operable to set the value of a CLP bit in the second standard asynchronous transfer mode cell to "1".

3. The switch control module of claim 1, wherein the from-switch port processor routes the first and second standard asynchronous transfer mode cells to an external system element for processing.

4. In an asynchronous transfer mode switch operable to communicate operation and maintenance data via internal cells, a switch control module operable to selectively convert plural standard asynchronous transfer mode cells to an internal cell, the switch control module comprising:

a to-switch port processor operable to detect whether two standard asynchronous transfer mode cells are candidates for conversion to an internal cell, and if so, to convert a first standard asynchronous transfer mode cell having a first header, an internal header, and miscellaneous information and a second standard asynchronous transfer mode cell having a second header and payload information into the single internal cell, wherein the to-switch port processor is operable to extract the internal header and miscellaneous information from the payload of the first asynchronous transfer mode cell, wherein the to-switch port processor is operable to extract the payload information from a payload of the second asynchronous transfer mode cell, and wherein the to-switch port processor is further operable to combine the extracted internal header, payload information, and miscellaneous information into the single internal cell.

5. The switch control module of claim 4, wherein the to-switch port processor is further operable to determine if the value of a CLP bit in the first asynchronous transfer mode cell is set to "0" and if the value of a CLP bit in the second asynchronous transfer mode cell is set to "1".

6. The switch control module of claim 4, wherein the to-switch port processor is further operable to discard the first header of the first asynchronous transfer mode cell and the second header of the second asynchronous transfer mode cell.

7. The switch control module of claim 4, wherein the to-switch port processor is further operable to perform a validity check on the first and second standard asynchronous transfer mode cells prior to extracting the internal header, payload information, and miscellaneous information from the first and second standard asynchronous transfer mode cells.

8. A system for converting between an internal cell and multiple standard asynchronous transfer mode cells, the internal cell comprising operation and maintenance data, the system comprising:

a to-switch port processor operable to generate an internal cell, the internal cell comprising an internal header, payload information, and miscellaneous information; and a switch control module coupled to the to-switch port processor, the switch control module operable to selectively insert the internal header and miscellaneous information from the internal cell into the payload of a first standard asynchronous transfer mode cell, the switch control module further operable to selectively insert the payload information of the internal cell into the payload of a second standard asynchronous transfer mode cell; and a switching fabric coupling the switch control module to the to-switch port processor.

9. The system of claim 8, wherein the switch control module is further operable to set the value of a CLP bit in the first standard asynchronous transfer mode cell to "0", the switch control module further operable to set the value of a CLP bit in the second standard asynchronous transfer mode cell to "1".

10. The system of claim 8, wherein the to-switch port processor is further operable to determine whether the internal cell is a special action cell destined for the switch control module.

11. The system of claim 9, wherein the switch control module includes at least one from-switch port processor having at least one special action queue and at least one normal queue for receiving an internal cell.

12. A method for using components of an asynchronous transfer mode switch to convert between an internal cell comprising operation and maintenance data and multiple standard asynchronous transfer mode cells, comprising the steps of:

receiving an internal cell by a from-switch port processor of said switch, the internal cell comprising an internal header, payload information, and miscellaneous information;

inserting, by the from-switch port processor, the internal header and the miscellaneous information into a first standard asynchronous transfer mode cell; and inserting, by the from-switch port processor, the payload information into a second standard asynchronous transfer mode cell.

13. The method of claim 12, further comprising the steps of:

setting, by the from-switch port processor, a value of a CLP bit in the first standard asynchronous transfer mode cell to "0"; and setting, by the from-switch port processor, a value of a CLP bit in the second standard asynchronous transfer mode cell to "1."

14. A method for using components of an asynchronous transfer mode switch to selectively convert between an internal cell comprising operation and control data and multiple standard asynchronous transfer mode cells, the method comprising the steps of:

receiving, by a from-switch port processor of the switch, an internal cell, the internal cell comprising a first portion of information and a second portion of information;

determining, by the from-switch port processor, whether the internal cell is a special action cell;

inserting, by the from-switch port processor, the first portion of information into a first standard asynchronous transfer mode cell in response to the internal cell being a special action cell; and inserting, by the from-switch port processor, the second portion of information into a second standard asynchronous transfer mode cell in response to the internal cell being a special action cell.

15. The method of claim 14, wherein:

the first portion of information comprises an internal header and miscellaneous information; and the second portion of information comprises payload information.

16. The method of claim 14, further comprising the steps of:

setting, by the from-switch port processor, the value of a CLP bit in the first standard asynchronous transfer mode cell to "0"; and setting, by the from-switch port processor, the value of a CLP bit in the second standard asynchronous transfer mode cell to "1".

17. A method for selectively converting between multiple standard asynchronous transfer mode cells and an internal cell, comprising operation and control data, the method performed by components of an asynchronous transfer mode switch and comprising the steps of:

receiving, by a to-switch port processor of the switch, a first standard asynchronous transfer mode cell and a second standard asynchronous transfer mode cell, the first standard asynchronous transfer mode cell comprising an internal header and miscellaneous information, the second standard asynchronous transfer mode cell comprising payload information;

extracting, by the to-switch port processor, the internal header and the miscellaneous information from the first standard asynchronous transfer mode cell;

extracting, by the to-switch port processor, the payload information from the second standard asynchronous transfer mode cell; and inserting, by the to-switch port processor, the extracted internal header, miscellaneous information, and payload information into an internal cell comprising the operation and control data.

18. The method of claim 17, further comprising the step of performing a validity check on the first and second standard asynchronous transfer mode cells by the to-switch port processor after the step of receiving.

19. The method of claim 17, further comprising the steps of:

determining, using the to-switch port processor, whether the value of a CLP bit in the first standard asynchronous transfer mode cell is set to "0"; and determining, using the to-switch port processor, whether the value of a CLP bit in the second standard asynchronous transfer mode cell is set to "1".

* * * * *

UNITED STATES PATENT AND TRADEMARK OFFICE
CERTIFICATE OF CORRECTION

PATENT NO. : 5,948,067
DATED : September 7, 1999
INVENTOR(S) : Stephen A. Caldara et al.

It is certified that error appears in the above-identified patent and that said Letters Patent is hereby corrected as shown below:

Column 2, line 65 reads "V0.35"

should read --V.35--

Signed and Sealed this

Twenty-ninth Day of May, 2001

Attest:

NICHOLAS P. GODICI

*Attesting Officer*   *Acting Director of the United States Patent and Trademark Office*